Figure 1:
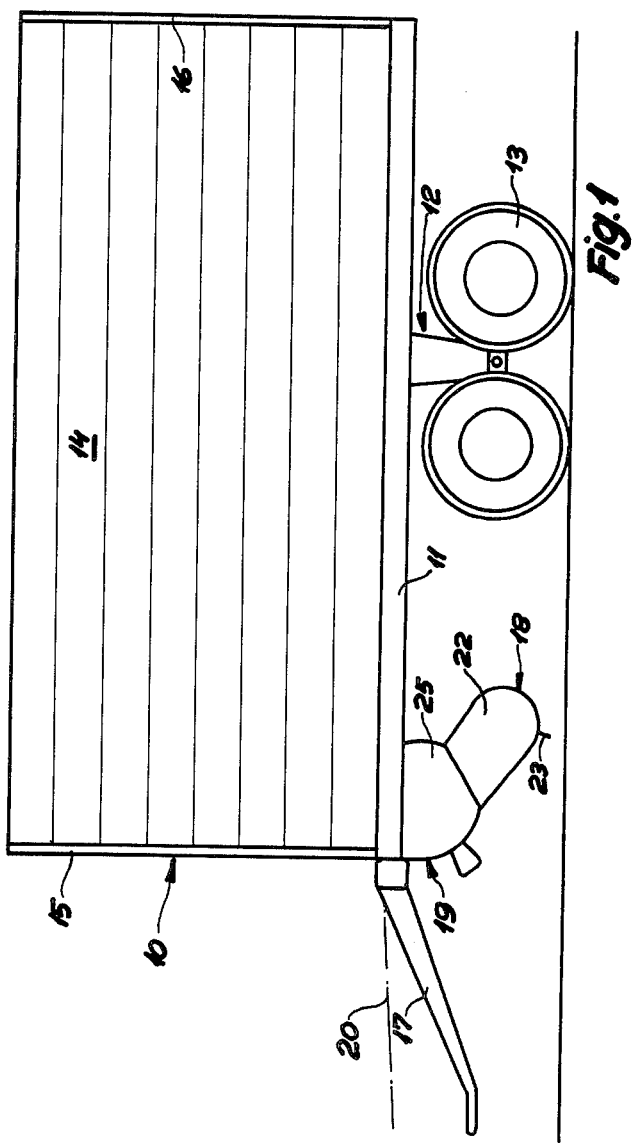

United States Patent [19]

Larsen et al.

[11] Patent Number: 4,479,347
[45] Date of Patent: Oct. 30, 1984

[54] LOADING VEHICLE FOR PICKING UP AND TRANSPORTING STRAW MATERIAL

[75] Inventors: Borge Larsen; Poul K. Pedersen; Georg Lauritzen, all of Kerteminde, Denmark

[73] Assignee: Maskinfabriken Taarup A/S, Kerteminde, Denmark

[21] Appl. No.: 409,413

[22] Filed: Aug. 19, 1982

[30] Foreign Application Priority Data

Aug. 20, 1981 [DK] Denmark ............................ 3688/81

[51] Int. Cl.³ .......................................... A01D 87/10
[52] U.S. Cl. ...................................... 56/344; 56/364; 414/505; 414/509
[58] Field of Search ...................... 56/344, 364, 473.5, 56/346, 347, 350, 351, 358; 414/505, 509

[56] References Cited

U.S. PATENT DOCUMENTS

| | | | |
|---|---|---|---|
| 3,050,203 | 8/1962 | De Biasi | 414/509 |
| 3,412,532 | 11/1968 | Nickla | 56/344 |
| 3,754,388 | 8/1973 | Neely, Jr. | 56/344 |
| 3,922,838 | 12/1975 | Kline et al. | 56/344 |
| 4,170,934 | 10/1979 | Oosterling et al. | 56/344 |
| 4,182,102 | 1/1980 | Anderson et al. | 56/364 |

FOREIGN PATENT DOCUMENTS

| | | | |
|---|---|---|---|
| 1149301 | 5/1963 | Fed. Rep. of Germany | 414/509 |
| 1163072 | 2/1964 | Fed. Rep. of Germany | 56/344 |
| 1198112 | 8/1965 | Fed. Rep. of Germany | 56/344 |
| 1285242 | 12/1968 | Fed. Rep. of Germany | 56/344 |
| 2444165 | 3/1976 | Fed. Rep. of Germany | 56/344 |

*Primary Examiner*—Gene Mancene
*Assistant Examiner*—David I. Tarnoff
*Attorney, Agent, or Firm*—Fleit, Jacobson, Cohn & Price

[57] ABSTRACT

A loading vehicle having a pick-up drum with resilient fingers for picking up straw material from the ground and a conveyor drum with conveyor arms, fitted in rows for carrying the material into the vehicle. The pick-up drum and the conveyor drum are disposed with respect to each other so that the conveying direction of the material is abruptly changed when the material is introduced into the path of motion of the conveyors. This produces a dâmming-up effect causing the material to be distributed over the entire conveyor front, which minimizes the tendency of squeezing between conveyors and the housing wall defining the conveyor duct at one side. The change in conveying direction also causes a certain compaction of the material, resulting in a better utilization of the available volume. The structure allows short spacing between the conveyor arms and closely spaced knives are positioned in the conveyor duct so that the blades of straw can be cut in small pieces which are suitable for ensilage.

9 Claims, 7 Drawing Figures

LOADING VEHICLE FOR PICKING UP AND TRANSPORTING STRAW MATERIAL

The invention relates to a loading vehicle for picking up and transporting straw material, comprising a rotary pick-up drum which is fitted at the front and has resilient pick-up fingers passing the straw material up to a rotary conveyor drum whose conveyors, fitted in rows, convey it up into the body of the vehicle through a duct, which at one side is defined by the drum and by strippers between which the conveyors pass. Such loading vehicles were originally developed for gathering in grass and hay in full length and are widely used, particularly on a difficult ground. To make them useful also for picking up grass for ensilage they were later provided with stationary knives in the conveyor duct for chopping the blades of grass.

In the known loading vehicles of the present type it is endeavored to establish a path of movement for the straw material which is as even and has as few obstacles as possible by an arrangement in which the pick-up drum, which is mounted at the front, conveys the material up to the lower, substantially horizontal part of the upwardly inclined lower wall of the duct, and then the further transport is ensured by the conveyors of the overhead conveyor drum whose outer ends in this region of the duct sweep closely past the lower wall of the duct, the conveyor drum rotating in the opposite direction of the pick-up drum. In this construction the straw material may be squeezed between the conveyors and the bottom of the duct. Where chopping is desired with a view to ensilage, chopping knives are fitted in the duct which extend up through the bottom of the duct so that the conveyors may pass between them. The squeezing tendency sets a limit to how closely spaced the conveyors in each row can be positioned, which makes it impossible to obtain such a short chopped length as is necessary to meet the requirements made today of good ensilage.

The object of the invention is to provide such an embodiment of a loading vehicle of the present type as eliminates or at any rate minimizes the squeezing tendency and consequent restrictions.

This object is achieved in that the pick-up drum is placed with respect to the conveyor drum so that the conveying direction of the straw material is abruptly changed at the inlet to the conveyor drum; the abrupt change in the conveying direction of the straw material, which takes place when the material encounters a set of conveyors, provides partly a damming-up effect causing the material to be distributed over the entire conveyor front or at any rate a great part of it, partly a certain compaction of the material which increases the capacity of the transport mechanism and results in a better utilization of the capacity of the vehicle.

The minimized squeezing tendency allows the use of closely spaced conveyors, and the spaces between the conveyors in each row can expediently be less than 30 mm.

It is particularly expedient to mount the pick-up drum below and behind the conveyor drum so that the pick-up drum can pivot upwards and rearwards, because it can then swing clear of obstacles and the distance between the hauling tractor and the loading vehicle can be reduced to greater degree than is feasible with the conventional loading vehicles.

When a knife is fitted at the inlet to the conveyor drum, said knife extending in the entire length of the drum and having a cutting edge which faces in the opposite direction of the one in which the conveyors pass the knife, at least a part of the straw material will be cut when the conveyors transport it past the knife.

A conveyor structure with closely spaced conveyors enables the transport mechanism to press the material up into the vehicle against a greater counterpressure than the one caused by the weight of overlying material in a completely filled vehicle. This circumstance makes it possible to avoid the use of complicated transport chains requiring much maintenance. Various simple and sturdy mechanisms for guiding the supplied material rearwardly in the vehicle are defined hereinafter.

Figure 2:
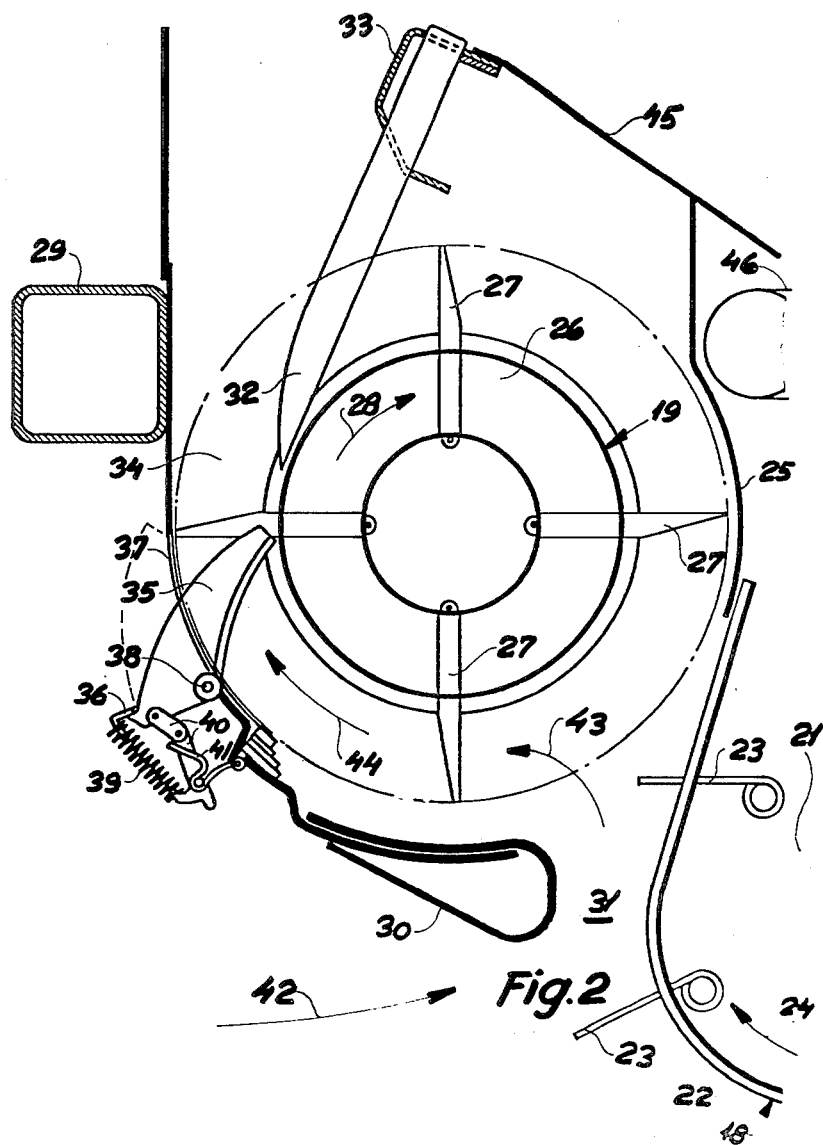
Figure 3:
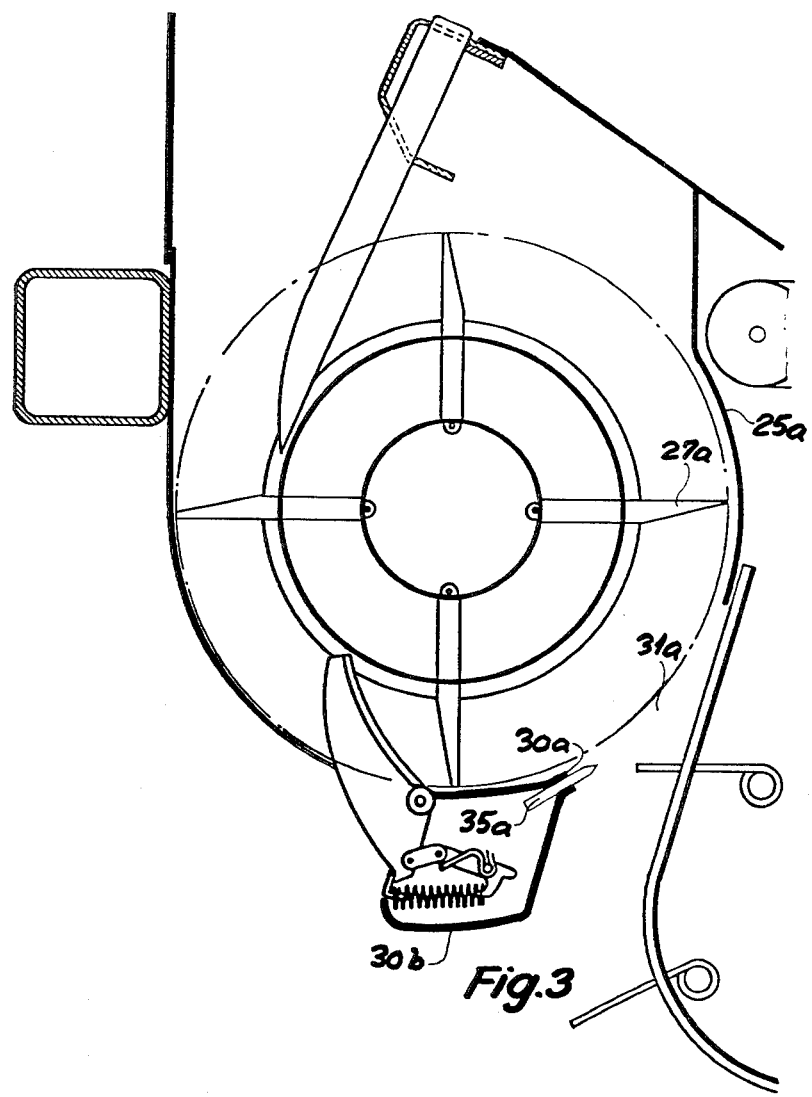

The invention will be explained more fully below with reference to the drawing, in which FIG. 1 is a side view of an embodiment of the loading vehicle of the invention, FIG. 2 is a schematic and enlarged view of the mechanism for picking up straw material from the ground and conveying it up into the body of the vehicle, FIG. 3 shows a somewhat modified embodiment of the mechanism of FIG. 2, and FIGS. 4-7 are schematic views of various types of vehicles with various mechanisms for distributing and-/or unloading the material.

The loading vehicle shown in FIG. 1 has a box-shaped body 10 comprising a bottom 11 resting on a bogie 12 with two pairs of wheels 13, side walls 14, a front wall 15 and a rear wall 16. The front end of the vehicle mounts a pull rod 17 by means of which the vehicle may be coupled to a tractor. At 20 is indicated a transmission means for transmitting drive force from the tractor to the driven elements of the loading vehicle. A pick-up and transport mechanism, which is seen best in FIG. 2, is mounted below the front end of the vehicle and comprises a pick-up 18 and a conveyor assembly 19.

The pick-up 18 has a drum 21 which extends in the entire width of the vehicle and is rotatably journalled in a housing 22. Four rows of resilient pick-up fingers 23 are peripherally spaced on the drum, and when the drum is rotated in the direction shown by an arrow 24 the fingers 23 sweep across the surface of the ground and lift and convey straw material disposed on the ground. The fingers 23 are controlled in a conventional, not shown manner so that they extend radially out through slits in the housing 22 during the active portion of their motion, but are pivoted rearwards from the radial position at the upper portion of their path of motion where they approach the conveyor assembly 19 so that they will not hit this assembly.

The conveyor assembly 19 is mounted above and ahead of the pick-up 18 so as to pick-up the straw material lifted by the pick-up and to convey it up into the body of the vehicle. This assembly has a drum 26 which is rotatably mounted in a housing 25, said drum 26 extending in the entire width of the vehicle and carrying a plurality of peripherally spaced rows of radial conveyor arms 27. Four rows of conveyors are shown in the drawing. The drum 26 is driven in the direction shown by an arrow 28. The rows of conveyors may be disposed in axial planes; but they may also be positioned along helical lines on the drum surface, which provides for a more even distribution of the load.

The upper portion of the conveyor assembly 19 extends up through an opening at the front portion of the bottom of the vehicle, which is indicated by a frame box beam 29 in FIG. 2. The lower portion 30 of the conveyor housing 25, defining together with the pick-up housing 22 an inlet opening 31, is provided with a softly rounded edge portion. A plurality of strippers 32 are secured to a carrier beam 33 inside the vehicle, from which they extend obliquely forwards and downwards toward the drum surface to prevent the straw material from following the conveyor drum all the way around. The strippers 32 are positioned opposite the spaces between the conveyors 27 and have a width which allows the conveyors to pass unobstructedly. The front portion of the housing 25 defines together with the drum 26 and the strippers 32 a conveyor duct 34.

In the embodiment shown, the conveyor duct 34 has mounted in it a set of chopping knives 35, which are disposed opposite their respective spaces between the conveyors 27 and extend from a knife holder beam 36, provided exteriorly of the housing 25, inwards toward the conveyor drum 26 through slits 37 in the housing. Each individual knife is pivotable in its own plane about a hinge 38 formed by the engagement of two hook-like members on the knife and the beam, respectively. Each knife 35 has a pressure spring 39 which, through a toggle mechanism 40, affects the knife resiliently to assume its operating position which is shown in full lines and is determined by the abutment of the toggle on a stop means 41. If a hard object, such as a stone, is conveyed together with the straw up into the duct 34, the spring 39 will yield and allow the knife 35 to pivot to the position shown in dashed lines. The knife assembly may also be arranged so that all the knives or groups of knives pivot at the same time. The knives chop the straw with a view to subsequent ensilage.

Straw material lying on the ground, as seen in relation to the loading vehicle, is introduced into the vehicle in the direction shown by an arrow 42. Immediately after being passed through the inlet opening 31 by the pick-up fingers 23, the material is gripped by a set of conveyors 27 conveying it in largely the opposite direction of the inlet direction, as indicated by arrows 43 and 44. This abrupt change in the direction of movement produces a damming-up effect, causing the straw material to be radially distributed over the entire conveyor front instead of accumulating, as is often the case in conventional structures, at the extremities of the conveyors, which results in a squeezing tendency between the conveyors and the housing. Further, the change in the direction of movement causes the material to be compacted more than it would otherwise be, resulting in a better utilization of the volume of the conveyor duct as well as of the body.

Having being pressed over the stripper beam 33 by the conveyors, the chopped straw material slides down a platform 45 to an intermittently operating conveyor belt 46, which is mounted on the bottom of the vehicle and transports the material stepwise rearwardly in the vehicle in a generally known manner.

The embodiment shown in FIG. 3 of the pick-up and transport mechanism differs from that of FIG. 2 in that in the edge portion 30a of the conveyor housing 25a defining the inlet opening 31a there is mounted an additional knife 35a, which extends in the entire length of the opening and whose cutting edge faces towards the opening and in an opposite direction of the one in which the conveyors 27a pass the opening. The cutting edge of the knife 35a may be straight or serrated, and the knife contributes to the chopping of the material fed. In the structure of FIG. 3 the lower portion of the conveyor housing also has a guard plate 30b extending forwardly from the knife 35a and screening the movable knife assembly from the ground.

The reduced squeezing tendency in the structure described in the foregoing allows the conveyors to be disposed closely spaced, which in turn permits a short chopped length and enables the conveyors to transport the material up into the vehicle against a great counter-pressure. Thus, it has been found that the conveyors can without difficulty press straw material into a completely filled vehicle.

Figure 4:
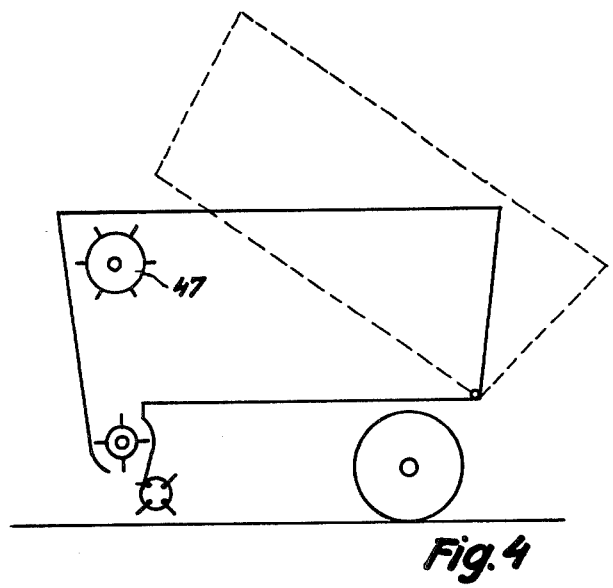

FIG. 4 schematically shows a two-wheel loading vehicle in which the lifting capacity of the conveyors is utilized for simplifying the means employed to carry the material rearwardly in the vehicle from the mouth of the conveyor duct. Thus, these means just comprise a rapidly rotating peg drum 47 fitted at the top in the vehicle just above the conveyor duct. As the material reaches the level of the peg drum, this drum throws it rearwards with such a great force that also the rear end of the vehicle will be completely filled. Unloading can take place by tipping the body as shown by the dashed lines.

Figure 5:
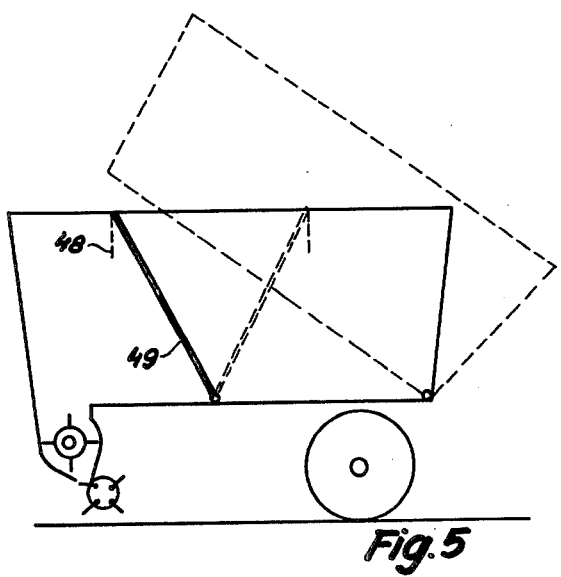

The loading vehicle shown in FIG. 5 has a scraper 48 which when being moved to and fro in horizontal grooves (not shown) along the upper edges of the sides of the vehicle directs the material rearwardly as it reaches above the lower edge of the scraper. The scraper must be suspended, in a known, not shown manner, so that it is kept substantially vertical during its rearward movement, but can pivot freely rearwards about an axis along its upper edge during its forward movement. The movement of the scraper can, e.g. as shown, be produced by a pair of drive arms 49 which are pivotally journalled at the bottom of the vehicle and connect the scraper to pin/slit connections (not shown). The drive arms can be pivoted to and fro by a hydraulic cylinder (not shown).

Figure 6:
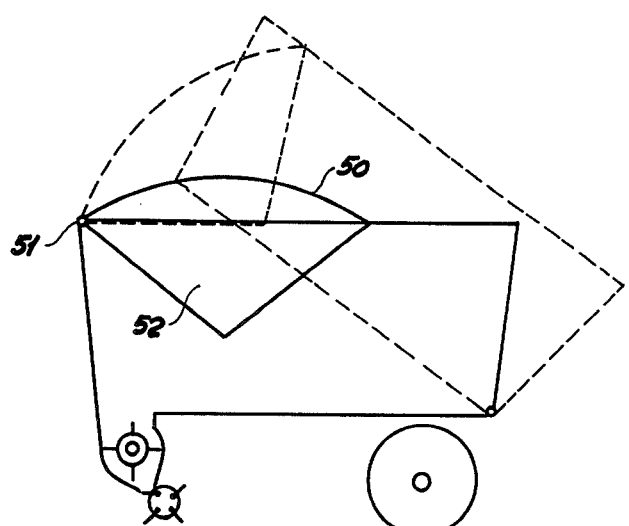

The loading vehicle shown in FIG. 6 has a curved guide plate 50 whose front edge at 51 is hinged to the upper edge of the front wall of the vehicle, from which the guide plate extends rearwards. The lateral edges of the guide plate mount two substantially triangular side plates 52 which extend downwards along the outer surface of the sides of the vehicle in the unaffected position of the guide plate, shown in FIG. 6. The guide plate and the side plates are made of a light-weight material, such as plastics. When the fed material reaches the underside of the guide plate 50, it lifts this plate and follows its curved underside and is thus guided rearwards in the vehicle.

Figure 7:
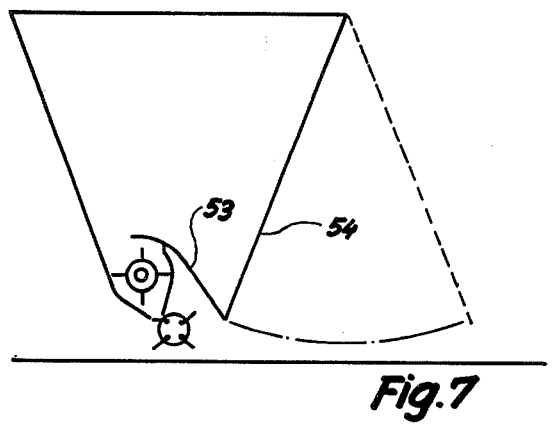

FIG. 7 shows a substantially truncated container or body which is particularly useful on a difficult ground. The container may be arranged to be carried by a tractor or may be provided with wheels like the other ones shown.

The base 53 of the container has a steep rearward and downward inclination from the mouth of the conveyor duct to the rear wall 54 of the container hinged at its upper edge so that unloading may be effected by pivoting the rear wall backwards as shown by a dashed line.

The loading vehicle of the invention can be modified in many other ways than those shown and described in the foregoing. For example, the pick-up 18 might be fitted ahead of the conveyor assembly 19, as it used to be.

We claim:

1. A loading vehicle for picking up and transporting straw material, comprising: a body for holding straw material; a rotary pick-up drum which is fitted at the front end of the body and has resilient pick-up fingers for passing the straw material up to a rotary conveyor drum including a conveyor drum inlet and a conveyor drum outlet and having conveyor arms fitted in rows for conveying the material up into the body of the vehicle through a duct, which at one side is defined by a housing at the outlet of the conveyor drum and at another side by stationary strippers between which the conveyor arms pass and which strip the conveyed material from the conveyor arms, the pick-up drum rotating in the same direction of rotation as the conveyor drum and positioned obliquely below and behind the conveyor drum so that the conveying direction of the straw material is abruptly changed at the inlet to the conveyor drum from a generally upward and rearward direction to a generally downward and forward direction to compact the straw material and equalize the distribution thereof across the conveyor drum inlet.

2. A loading vehicle according to claim 1, wherein the pick-up drum is so disposed that it can be pivoted upwards and rearwards.

3. A loading vehicle according to claim 1, wherein a knife is fitted so as to extend into the path along which the material passes from the pick-up drum to the conveyor drum, said knife extending in the entire length of the drum and having a cutting edge which faces in the opposite direction of the one in which the conveyors pass the knife.

4. A loading vehicle according to claim 1, wherein a rapidly rotating peg drum is mounted above the conveyor drum and at the top of the body of the vehicle, said peg drum extending substantially in the entire width of the vehicle.

5. A loading vehicle according to claim 1, wherein the top of the body of the vehicle mounts a scraper which extends transversely to the vehicle and substantially in the entire width of said vehicle and is movable to and fro longitudinally of the vehicle, said scraper being suspended so that it is retained in a substantially vertical position during its rearward movement and can pivot freely about an axis disposed in parallel with and adjacent its upper edge during its forward movement.

6. A loading vehicle according to claim 1, wherein shaft pins at each end of the scraper engage a slit in their respective ones of two drive arms, which are parallel with each other and are at the lower end pivotally journalled adjacent the bottom of the vehicle, drive means being provided to pivot the drive arms to and fro.

7. A loading vehicle according to claim 1, wherein a curved guide plate is provided which extends substantially in the entire width of the vehicle and is freely pivotable about an axis extending along the front, upper edge of the body of the vehicle.

8. A loading vehicle according to claim 7, wherein a side place is secured along each side edge of the guide plate.

9. A loading vehicle according to claim 1, wherein said body is a short, substantially truncated body, the base of the body is inclined downwardly and rearwardly from the rear edge of the opening through which the straw material enters the body of the vehicle, and the rear wall of said body is pivotable about its upper edge.

* * * * *